United States Patent [19]

Flanagan et al.

[11] 4,008,376
[45] Feb. 15, 1977

[54] LOUDSPEAKING TELECONFERENCING CIRCUIT

[75] Inventors: James Loton Flanagan, Warren; Donald John MacLean, Jr., Scotch Plains; James Edward West, Plainfield, all of N.J.

[73] Assignee: Bell Telephone Laboratories, Incorporated, Murray Hill, N.J.

[22] Filed: Oct. 17, 1975

[21] Appl. No.: 623,545

[52] U.S. Cl. ............................................ 179/1 CN
[51] Int. Cl.² ........................................ H04M 3/08
[58] Field of Search .......... 179/1 CN, 1 HF, 1 VC, 179/81 B

[56] References Cited

UNITED STATES PATENTS

| | | | |
|---|---|---|---|
| 1,944,283 | 1/1934 | Strecker | 179/1 CN |
| 3,046,354 | 7/1962 | Clemency | 179/1 HF |
| 3,437,758 | 4/1969 | Clement | 179/1 CN |
| 3,530,247 | 9/1970 | Huber | 179/1 CN |
| 3,751,602 | 8/1973 | Breeden | 179/81 B |
| 3,755,625 | 8/1973 | Maston | 179/1 CN |
| 3,860,756 | 1/1975 | Shinoi | 179/81 B |
| 3,891,801 | 6/1975 | Wang | 179/1 CN |

Primary Examiner—Kathleen H. Claffy
Assistant Examiner—E. S. Kemeny
Attorney, Agent, or Firm—J. S. Cubert

[57] ABSTRACT

A loudspeaking teleconferencing circuit serving a plurality of remote conference room locations includes a plurality of speakerphone sets at each conference room location and a communication network connected to an incoming and an outgoing terminal at each location. The transmit channel of each set couples a microphone to the outgoing terminal; the receive channel of each set couples the incoming terminal to a loudspeaking device; and a control circuit selectively activates one of the set transmit and receive channels at a time responsive to speech energy present on the transmit and receive channels. Each set control circuit is operative independently of the control circuits of the other sets; and the outputs of all active transmit channels are combined and applied through the location outgoing terminal to the communication network. The communication path is adapted to transmit the conference room combined output from the conference room location outgoing terminal to only the other remote location incoming terminals.

19 Claims, 6 Drawing Figures

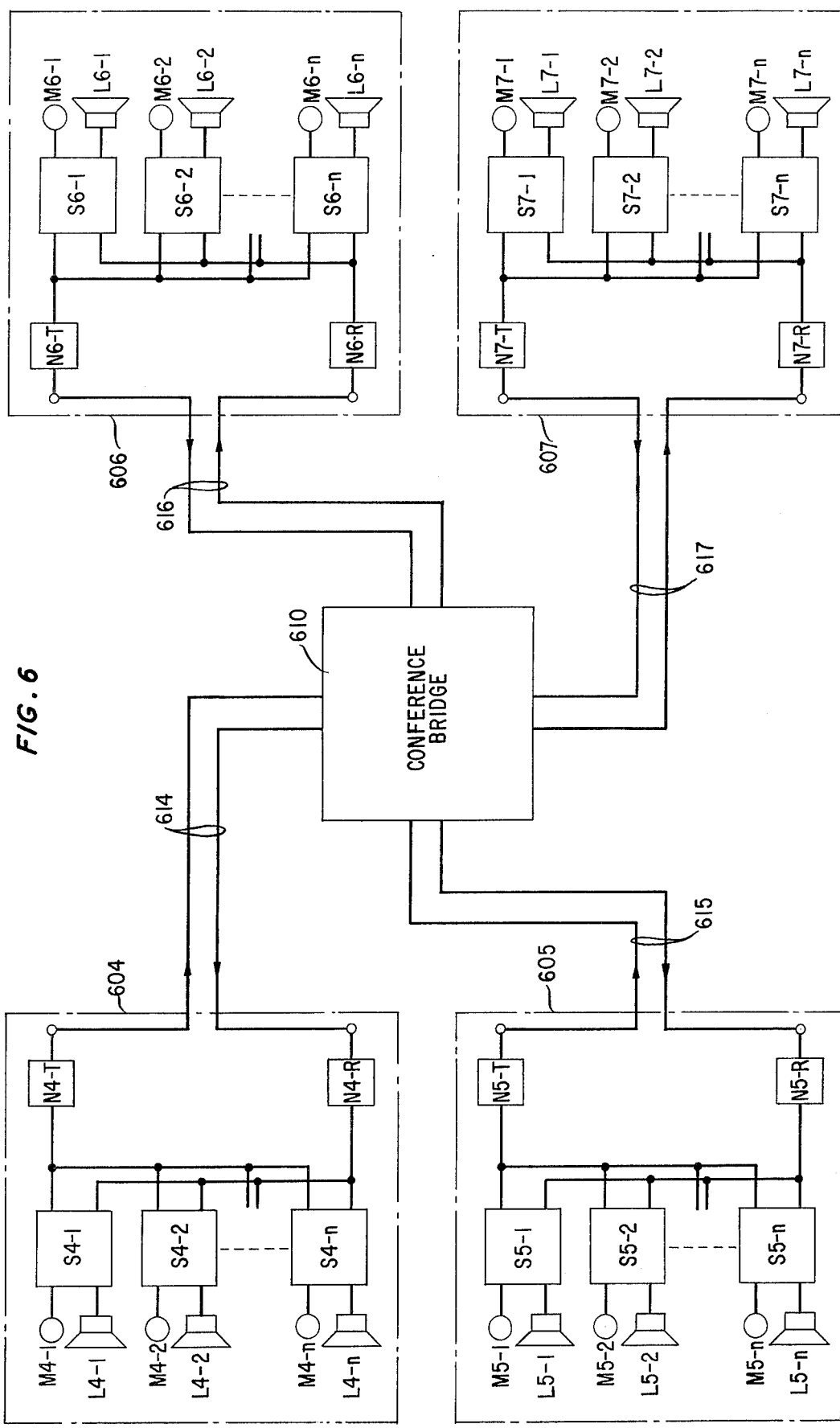

LOUDSPEAKING TELECONFERENCING CIRCUIT

BACKGROUND OF THE INVENTION

Our invention is related to teleconferencing arrangements and, more particularly, to loudspeaking type teleconference systems.

Loudspeaking telephones, as is well known in the art, e.g., U.S. Pat. No. 3,046,354, issued to W. F. Clemency July 24, 1964, employ automatic gain adjustment in the transmitting and receiving channels responsive to the presence or absence of speech energy in one of the channels to control the direction of transmission. Such a voice-switched control arrangement provides a customer with a hands-free telephone instrument so that the customer is not restricted by the conventional handset.

Loudspeaking arrangements can be useful in a teleconferencing system wherein a number of conferees at one location are placed in communication with a number of conferees at a remote location via a telephone connection. The quality of the transmission between the two separated groups of conferees is generally dependent on the position of each conferee with respect to the microphone and loudspeaking device at each location. With a single microphone and loudspeaking device in the conference location room, the transmission is subject to degradation because some of the conferees are generally at a greater than optimum distance from the microphone and loudspeaking device.

It has previously been known to use a plurality of microphones appropriately spaced at each conferee location such as a conference room to improve the quality of the conference system. The microphone outputs are summed and the summed output is applied to the communication links between locations. In such an arrangement, each conferee can be within an acceptable distance from one of the microphones, whereby speech pickup is of relatively good quality. With all microphones turned on at one time, however, several undesirable effects occur. The total noise pickup is much greater than for a single microphone. The artificial reverberation effects occasioned by the delayed signal pickup from the more remote microphones severely lower the quality of the conference transmission. Further, electroacoustic instability can easily result from the plurality of the always turned on microphones. It is therefore desirable to provide a switching arrangement which permits only those microphones closest to the talking conferees to be active so that reverberation and noise pickup are minimized and additional gain may be inserted.

Techniques are well known for selecting a single microphone of a plurality of conferee microphones and for transmitting the signal from only the selected microphone. Such an arrangement is commonly known as a "voting circuit." In the "voting circuit" arrangement, the loudest talker can capture control and lock out the other conferees at his location. Automatic switching between microphones responsive to the highest speech level at the microphones may also result in transmission interruptions which adversely affect intelligibility and can result in unwanted interference occasioned by transient room noise. For example, a loud noise at one of the conference locations may completely turn off the controlling microphone. Further, since only one microphone is operative at a time, transfer of control from one microphone to another such as occasioned by the talking conferee moving from one position to another in a room location can result in speech transmission of varying quality, interruptions in transmission, and reverberation effects which vary with the talking conferee's position. Further, for good acoustical stability, any microphone which is on should be able to influence and actuate the loudspeaker source closest to it without necessarily reducing the output levels of other loudspeaking devices at more remote positions at the location.

Manually switching microphones on and off as needed is workable but is generally not useful, since it requires that each conferee by constantly alert to actuate his microphone switch when he wished to talk.

In one type of prior art conference system disclosed, for example, in U.S. Pat. No. 3,395,255, issued to F. J. Clement, a plurality of microphones and loudspeaking devices are placed in each conference room or location. Each mircophone is connected to an individual voice-switched network and the outputs of the individual voice-switched networks are combined. The combined output is applied to a telephone line via a common voice-switched network, and a plurality of loudspeaking devices are commonly connected to the common voice-switched network. The individual voice switched networks are responsive to the combined output to maintain a constant output level. While one microphone generally captures control, a plurality of microphones can be active concurrently. The common voice-switched network, however, controls the direction of transmission in the telephone line. In a conference hookup between first and second locations, the conferees at the first location hear the talking conferee at the first location. A conferee at the second location, however, will not hear the talking conferee at the first location if the direction of transmission controlled by the common voice-switched networks is from the second location to the first location. In such an arrangement, the conference hookup allows only one-direction transmission at a time between locations.

The common voice-switching network, in providing transmission from only one location at a time, of course, prevents regenerative feedback or singing. But the requirement of such unidirectional transmission between the two locations gives rise to a considerable impediment in the conference hookup. It is an object of our invention to provide a loudspeaking teleconferencing system for a plurality of remote room locations in which speech pickup, transmission, and distribution are not adversely affected by the use of a plurality of microphones and loudspeaking devices at each of a plurality of conference room locations.

SUMMARY OF THE INVENTION

Our invention is directed to a teleconferencing circuit serving a plurality of remote conference room locations in which a plurality of loudspeaking telephone sets are placed at each location and the communication path interconnecting said locations includes an incoming terminal and an outgoing terminal at each location. Each loudspeaking telephone set includes a microphone, a transmit channel having an input connected to said microphone and an output, a loudspeaking device, and a receive channel having an output connected to said loudspeaking device and an input coupled to said incoming terminal. A control circuit in each loudspeaking telephone set is operative responsive to the speech energy on the set transmit channel and the speech energy on the set receive channel for activating only one of said set transmit and receive channels.

According to one aspect of the invention, each set control circuit is responsive to speech signals on the set transmit channel for generating a first signal and is further responsive to speech signals on the set receive channel for generating a second signal. The control circuit includes means connected to the set transmit and receive channels responsive to the first signal being greater than the second signal for turning on the set transmit channel and turning off the set receive channel and responsive to the second signal being equal or greater than the first signal for turning on the set receive channel and turning off the set transmit channel.

According to another aspect of the invention, one or more set transmit channels at each conference room location and at least one other receive channel at each conference room location may be operative at the same time so that speech signals may be simultaneously exchanged among a plurality of talking conferees at different remote conference room locations.

According to yet another aspect of the invention, the control circuit of each set at a conference room location operates independently of the other set control circuits at that location whereby a talking conferee renders only his own receive channel inoperative and all other set receive channels are unaffected.

According to another aspect of the invention the communication path comprises a bidirectional transmission line coupled from a common communication network to each conference room location, and a hybird is connected between the incoming and outgoing terminals at each location and the bidirectional line.

According to another aspect of the invention, the common path comprises a 4-wire line including an incoming line and an outgoing line coupled to each location. The location outgoing terminal is connected to the outgoing line and the location incoming terminal is connected to the incoming line.

According to another aspect of the invention, the communication path includes a conference bridge for the interconnection of more than two remote conference locations.

According to yet another aspect of the invention, the microphone of each loudspeaking telephone set is unidirectional, and the microphone of each set at each location is acoustically separated from the loudspeaking devices of the other sets at the same conference room location.

According to yet another aspect of the invention, the microphone of each loudspeaking device is omnidirectional, and the microphone of each set at a location is acoustically and physically separated from the loudspeaking devices of the other sets at the same conference room location.

BRIEF DESCRIPTION OF THE DRAWING

FIG. 6 shows a block diagram of a teleconferencing system in which four locations are interconnected through a conference bridge.

DETAILED DESCRIPTION

Figure 1:
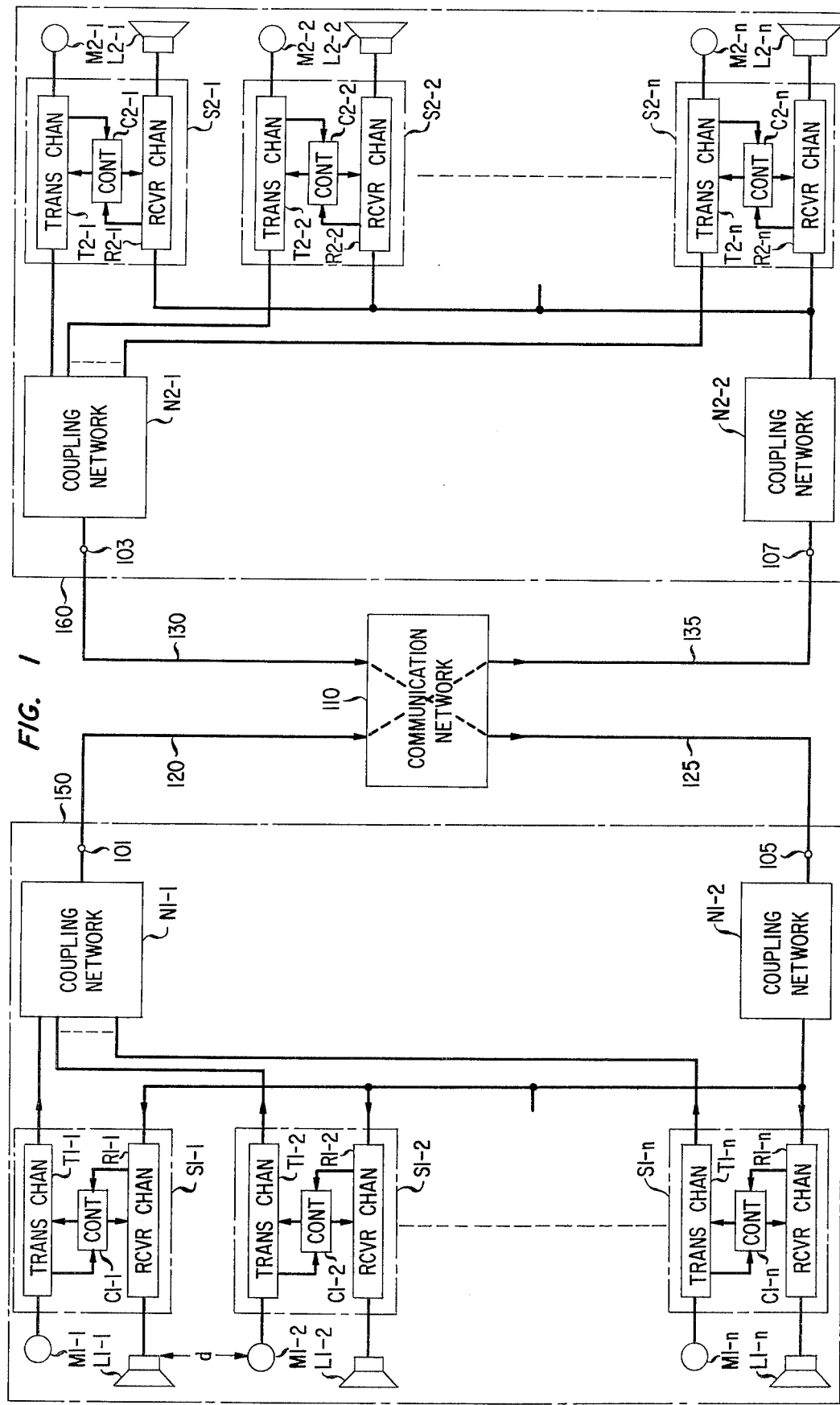
FIG. 1 depicts a block diagram of a loudspeaking teleconferencing circuit between two remote locations illustrative of the invention.

FIG. 1 depicts a loudspeaking teleconferencing circuit adapted to interconnect location 150 and location 160 via communication network 110. Loudspeaking telephone sets S1-1 through S1-n are placed at location 150 to serve a plurality of conferees. Similarly, loudspeaking telephone sets S2-1 through S2-n are placed at location 160 to serve a plurality of conferees thereat. Each loudspeaking telephone set incorporates a transmit channel, a receive channel, and a control circuit for switching between said transmit and receive channels in complementary fashion. In set S1-1, for example, transmit channel T1-1 has its input connected to microphone M1-1 and its output connected to coupling circuit N1-1. Receive channel R1-1 has its input connected to coupling network N1-2 and its output connected to loudspeaking device L1-1.

Control C1-1 is operative to derive a first signal from the speech energy on transmit channel T1-1 and a second signal from the speech energy on receive channel R1-1. Control C1-1 is responsive to the first signal being greater than the second signal to turn on channel T1-1 and to turn off receive channel R1-1 but not the receive channels of sets S1-2 through S1-n. In this transmit mode of operation, transmit channel T1-1 amplifies the speech energy signal from microphone M1-1 and applies the amplified speech energy signal to coupling network N1-1, which, in turn, is connected to outgoing terminal 101. Receive channel R1-1 is inoperative in the transmit mode so that no significant speech energy is transmitted therethrough to loudspeaking device L1-1.

Control C1-1 is responsive to the first signal being less than or equal to the second signal to render receive channel R1-1 operative and transmit channel T1-1 inoperative. In this receive mode of operation, speech energy from coupling network N1-2 originating at location 160 is amplified in receive channel R1-1 and applied to loudspeaking device L1-1. The speech energy originating at location 160 is also amplified in the receive channels of the other of sets S1-1 through S1-n which are operative in receive mode. Transmit channel T1-1 is inoperative so that only an insignificant amount of speech energy from microphone M1-1 is transmitted to outgoing terminal 101. Sets S1-2 through S1-n operate in similar manner.

The control circuit of each set operates independently of the control circuits of the other sets, whereby two or more microphones may be active concurrently. Each transmit channel is turned on responsive to the speech energy incident at that set independently of the other sets at the location. When a given microphone is active and its associated set transmit channel is on, the receive channel of that set is inactive but other set receive channels may be active. The loudspeaking telephone sets at location 160 operate in similar fashion so that one or more transmit channels at that location may be on concurrently to supply speech energy to outgoing terminal 103 via coupling network N2-1.

The outputs of the active transmit channels of location 150 are combined in coupling network N1-1 and the combined output signal is applied to outgoing terminal 101. Outgoing line 120 applies this combined output signal to incoming line 135 of location 160 via communication network 110 so that the combined output signal from location 150 is applied to coupling network N2-2 via incoming terminal 107 of conference room location 160. Network N2-2 distributes the conference signal from location 150 to receive channels R2-1 through R2-n. Where control C2-1 of set S2-1 renders receive channel R2-1 operative, the conference signal output of location 150 is amplified in receive channel R2-1 and is applied to loudspeaking device L2-1. Similarly, the other active receive channels at location 160 amplify the conference output signal obtained from conference room location 150 and apply this conference signal to their respective loudspeaking devices. In this manner, all talking conferees at location 150 are heard by the conferees at location 160. In the event that one or more transmit channels at location 160 are turned on concurrent with an output signal from location 150 being received, the loudspeaking devices of the remaining conferees at location 160 are nevertheless operative to provide simultaneous bidirectional conference transmission between location 150 and location 160.

Speech energy incident on a microphone at location 160, e.g., microphone M2-1, may be of sufficient magnitude to turn on transmit channel T2-1 and turn off receive channel R2-1. Channel T2-1 amplifies the speech energy and applies the amplified speech energy to coupling network N2-1. Similarly, other microphones at location 160 may be connected via their respective active transmit channels to network N2-1. Network N2-1 combines the outputs of active transmit channels at location 160 and applies the combined output to outgoing terminal 103. This combined output is applied via outgoing line 130, communication network 110 and incoming line 125 to incoming terminal 105 of location 150. Network N1-2 is operative to distribute the output speech signals received from location 160 to receive channels R1-1 through R1-n. The active receive channels, e.g., R1-2, amplify the conference signal incoming from location 160 and apply the amplified signal to the loudspeaking devices connected to active receive channels at location 150, e.g., loudspeaking device L1-2. In this manner, the speech output of conferees at location 160 is heard by the conferees at location 150.

Each conferee, or a relatively small group of conferees, may have their own loudspeaking telephone set so that they are within an optimum range of a given set microphone and loudspeaking device. In this way, good signal quality is maintained in the conference connection. Each transmit channel is turned on responsive to the speech energy incident thereto being greater than a predetermined threshold. Thus, relatively low level noise incident at a microphone does not appear at the outgoing terminal of the location, but two or more transmit channels at a location may be active concurrently.

The microphone and loudspeaking devices of each speakerphone set at a location are placed in relatively close proximity to each other and the microphone may be of the unidirectional or omnidirectional type. Since only one of the set transmit and receive channels is active at a time, there is no possibility of acoustic coupling or "sing around" between a set microphone and loudspeaking device, e.g., M1-1 and L1-1. Where omnidirectional microphones are used, each speakerphone set microphone is placed at a relatively large distance from the other loudspeaking devices at the location compared to the distance between a set microphone and loudspeaking device. This is done to provide a degree of acoustic separation between the sets at a location to prevent coupling between the active loudspeaking device of one set and an active microphone of another set, e.g., L1-2 and M1-1. Further, the active transmit channel threshold is influenced by the speech energy on set receive channel whereby higher signal levels at the outputs of other set active receive channels are isolated from the active transmit channel.

Where, for example, a conference location comprises a 30-foot conference table in a conference room and omnidirectional microphones are used, three speakerphone sets are adequate and the microphone and loudspeaking device of each set could be typically placed a distance about 12 feet from the microphone and loudspeaking device of the other sets. Such an arrangement provides adequate acoustical separation between sets to prevent regenerative feedback. With such predetermined spacing, it has been observed that a talking conferee at one microphone will activate his associated set transmit channel at a much lower speech energy level than required for the same conferee to activate a more distant set transmit channel. This in part is due to the switching threshold in the speakerphone set control circuitry which is a function of the speech energy level on the set receive channel. Consequently, a speakerphone set transmit channel at one location may be active concurrently with the receive channels of the other speakerphone sets at the same location and, in accordance with the invention, the talking conferee at one location is heard at the other location, while speech signals transmitted from the other location via the interconnecting communication path are heard at said one location through the active receive channels thereat and no regenerative coupling problem occurs at normal conversational levels.

Figure 2:
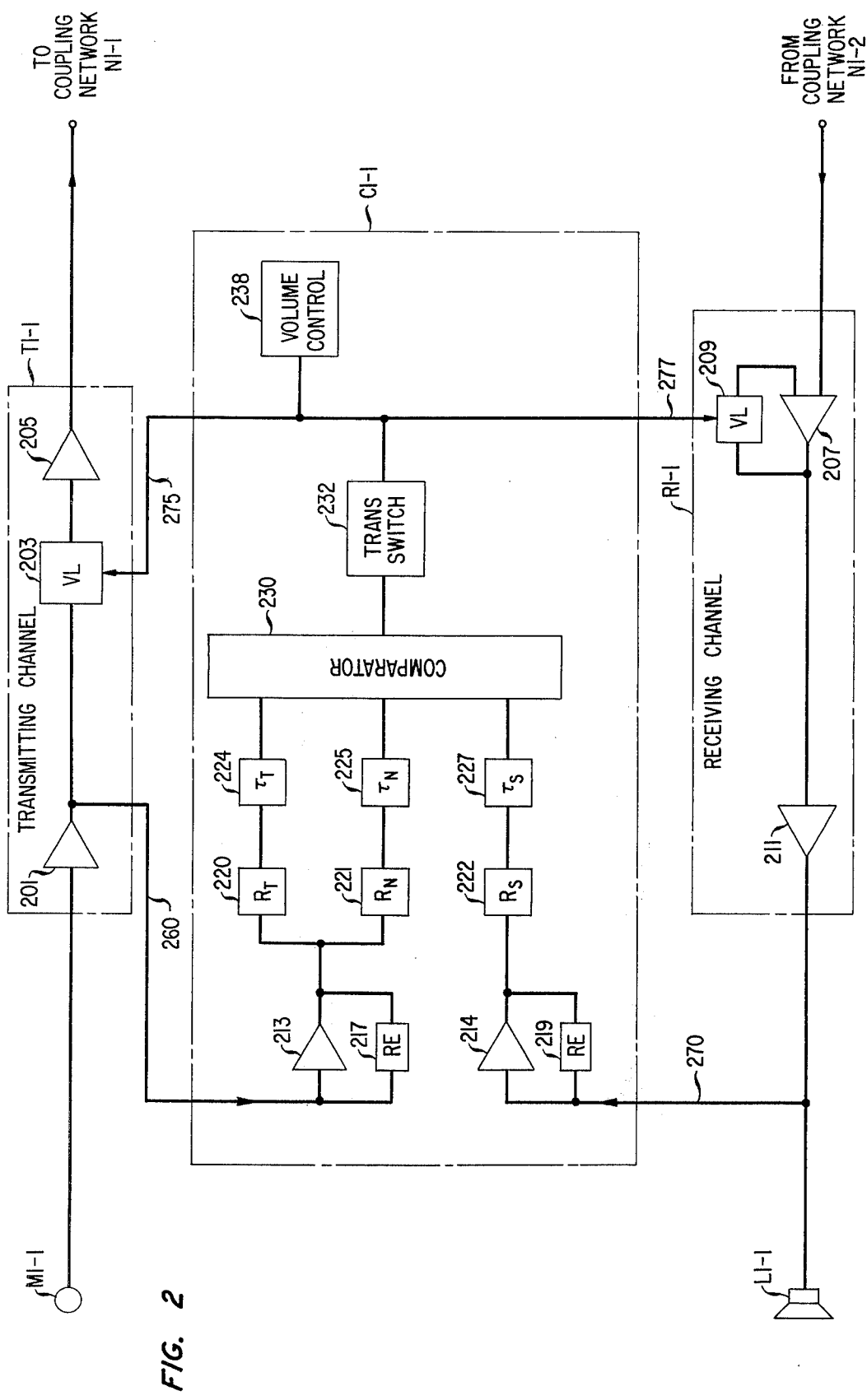
FIG. 2 depicts a detailed block diagram of one type of loudspeaking telephone set which may be used in the teleconferencing system illustrative of the invention.

FIG. 2 depicts a speakerphone set, such as set S1-1, which may be used in the teleconferencing circuit of the invention. In FIG. 2, transmit channel T1-1 comprises preamplifier 201, variolosser 203, and amplifier 205. The input of preamplifier 201 is connected to microphone M1-1 so that speech energy incident at the microphone is amplified independent of the action of variolosser 203. One output of preamplifier 201 is supplied to variolossser 203, which, as is well known in the art, is a variable attenuation device controlled by an external signal. The output of variolosser 203 is applied to coupling network N1-1 of FIG. 1 through amplifier 205.

Receive channel R1-1 in FIG. 2 comprises amplifier 207 which has variolosser 209 connected in its feedback loop and amplifier 211 for coupling the output of amplifier 207 to loudspeaking device L1-1. The input of amplifier 207 is obtained from coupling network N1-2, which network receives the incoming signal from communication network 110 of FIG. 1. Variolosser 209 provides an attenuation responsive to control circuit C1-1 so that the output of amplifier 207 is selectively controlled.

Control amplifier 213 in control C1-1 in FIG. 2 receives the speech energy output of preamplifier 201 via lead 260. The output of amplifier 213 is supplied to the network comprising rectifier 220 and time constant circuit 224, and the network comprising rectifier 221 and time constant circuit 225. Rectifier 220 receives the amplified speech energy from amplifier 213 and provides a DC signal proportional to the speech energy level with a time constant determined by circuit 224. The time constant may be appropriately selected so that the output of rectifier 220 rises to full output voltage in approximately 5 milliseconds and decays in approximately 120 milliseconds to provide an attack time which prevents initial speech clipping and a release time that is sufficiently long to avoid final clipping and to maintain the system in transmit mode during normal speech pauses. Noise rectifier 221 in combination with time constant circuit 225 provides a DC output voltage which requires approximately 4 or 5 seconds to reach full output voltage but decays within approximately 8 milliseconds. In this manner, an input from rectifier 221 and circuit 225 to comparator 230 is responsive only to steady state noise incident at microphone M1-1.

The input to receive channel R1-1 from coupling circuit N1-2 is applied to amplifier 219 via lead 270 and therefrom to receive rectifier 222. Rectifier 222 is operative to provide a DC signal proportional to the speech energy on receive channel R1-1 with a time constant determined by circuit 227.

Comparator 230 may be a differential three-input integrated circuit, such as Western Electric Type 502J comparator circuit, designed to determine the relative magnitude of the three inputs applied thereto. The output of comparator 230 is applied via transmit switch 232 and volume-adjusting control 238 to variolossers 203 and 209. Transmit switch 232 may comprise a saturating type amplifier having one of two voltage level outputs. In one state, the transmit switch 232 is operative to provide full gain through transmit channel T1-1 while simultaneously providing substantially reduced gain through receive channel R1-1. In the other state, switch 232 is operative to provide full gain through receive channel R1-1 via variolosser 209 and substantially reduced gain through transmit channel T1-1 via variolosser 203. Variolossers 203 and 209 are operative in complementary fashion responsive to the output of transmit switch 232 so that regenerative feedback is prevented.

When a signal appears at the output of preamplifier 201 in the transmit channel, the resulting DC voltage signal from transmit rectifier 220 is applied to comparator 230, wherein it is compared to the DC voltage signals from rectifiers 221 and 222. Where the DC signal from transmit rectifier 220 applied to comparator 230 is larger than the DC signal from noise rectifier 221 or the DC signal from receive rectifier 222, comparator 230 is operative to hold transmit switch 232 in its talk state so that transmit channel variolosser 203 provides low attenuation and receive channel variolosser 209 provides high attenuation. Thus transmit channel T1-1 is turned on and speech energy incident at microphone M1-1 results in a speech signal applied to network N1-2 from the output of amplifier 205. Variolosser 209 provides high attenuation in the receive channel, and the receive channel is not effective to drive loudspeaking device L1-1.

If the DC signal from noise rectifier 221 is larger than the output of transmit rectifier 220 or receive rectifier 222, comparator 230 holds transmit switch 232 in its quiescent state. Variolosser 209 provides low attenuation so that the receive channel is turned on, and transmit channel T1-1 is rendered inactive by variolosser 203. If the output of receive rectifier 222 is larger than either of the outputs from transmit rectifier 220 or noise rectifier 221, comparator 230 is operative to turn on receive channel R1-1 and to turn off transmit channel T1-1.

In the circuit of FIG. 2 it is readily seen that the active transmit channel T1-1 is operative via control circuit C1-1 to prevent turning on receive channel R1-1 until speech energy is removed from transmit channel T1-1. The signal from location 160 (FIG. 1) is available to conferees from other set receive channels.

Range extender 217 connected in the feedback loop of control amplifier 213 comprises a nonlinear network, well known in the art, adapted to maintain the output level of amplifier 213 over a relatively large range of incident speech energy applied to microphone M1-1. Range extender 219 in the feedback loop of amplifier 214 similarly permits the operation of control circuit C1-1, with relatively large variations in the signal applied to amplifier 214. In this manner, control circuit C1-1 controls the operating mode of the speakerphone set so that only one of the transmit and receive channels of the set is active at a time over the range of expected speech energy levels.

Figure 3:
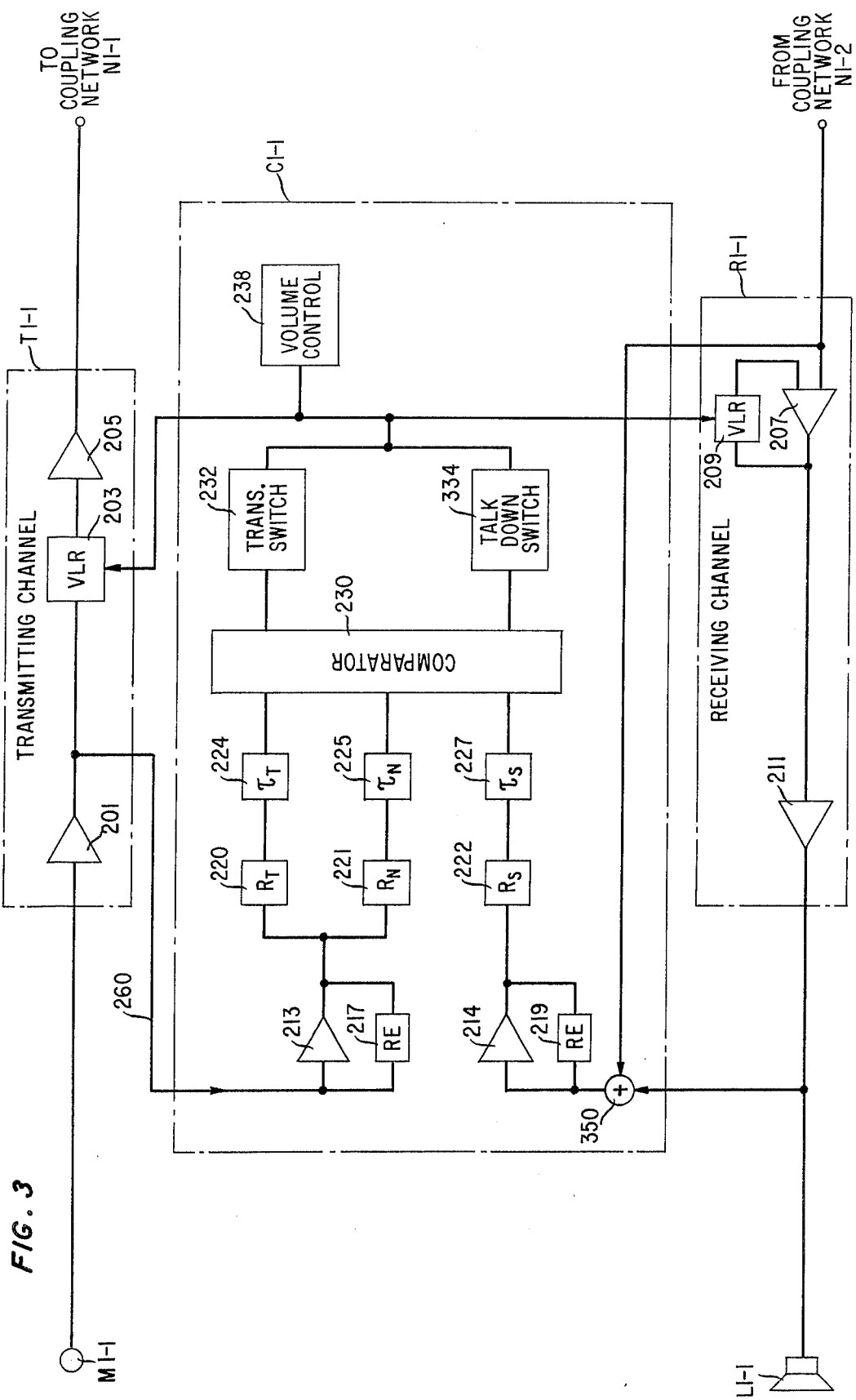
FIG. 3 depicts a detailed block diagram of a modified loudspeaking telephone set which may be used in the teleconferencing system illustrative of the invention.

The speakerphone set of FIG. 3 is substantially similar to the set described with respect to FIG. 2, except that a separate talk-down switch 334 is connected between the comparator output and variolossers 203 and 209. Talk-down switch 334 is operative to switch the operating mode of the speakerphone set between transmit and receive as is transmit switch 332. Talk-down switch 334, however, is responsive to the initiation of the receive mode to provide a fast release time for the transmit channel so that initial clipping of the receive speech signal is avoided. Transmit switch 332, on the other hand, includes a time constant network which provides a slow release time by which the system is held in transmit mode to avoid choppiness in the transmit speech and final clipping. By using the talk-down switch in parallel with the transmit switch, the receive channel is operative to break in and take control over the speakerphone set operation within a relatively short time period, as compared to the normal transition mode from transmit to receive.

Linear adder 350, as described in U.S. Pat. No. 3,751,602 issued to Lewis Breeden Aug. 7, 1973, permits an adaptive selection of the threshold at which the speakerphone set control circuit switches between transmit and receive mode set. In the teleconferencing circuit of FIG. 1, the level at which modes are switched in the control circuits is arranged so that the transmit channel of a talking conferee at one location, e.g., location 150, is not turned off by the speech signal of a subsequent talking conferee at location 160, unless the speech signal transmitted from location 160 is very high. In this manner, the conferees at locations 150 and 160 hear both the talking conferees at normal levels of speech. Consequently, the conference arrangement of the invention avoids interruptions in transmission previously required for preventing regenerative feedback. The use of a plurality of independently controlled speakerphone sets at each location with appropriate acoustic separation between sets according to the invention solves the problem of regenerative feedback without requiring one direction at a time transmission between locations.

Figure 4:
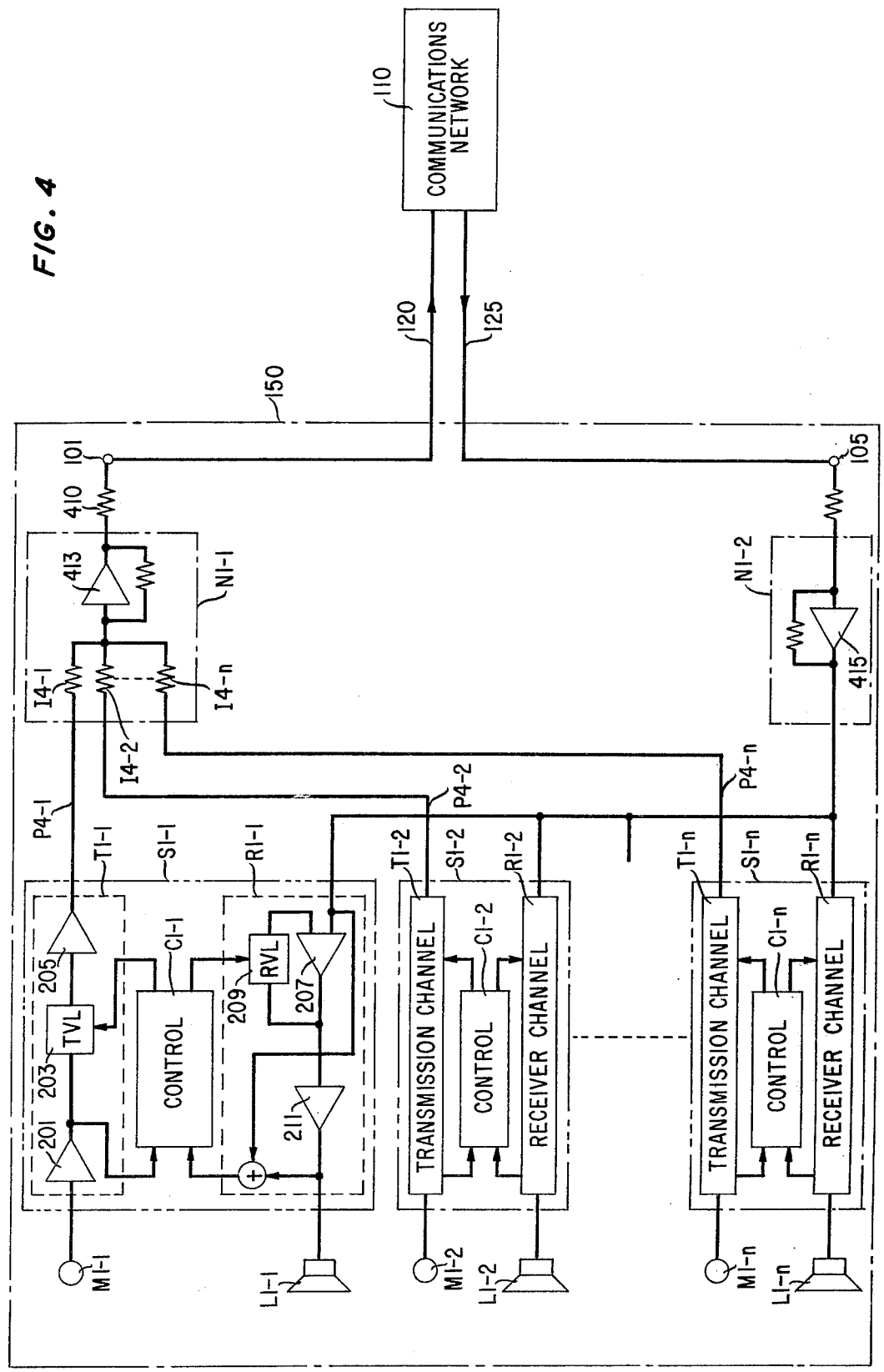
FIG. 4 shows a portion of the teleconferencing circuit of FIG. 1 wherein the coupling arrangements of the loudspeaking telephone set transmit and receive channels are illustrated.

FIG. 4 shows a portion of the teleconferencing circuit of FIG. 1 which includes location 150 and communication network 110. Each of sets S1-1 through S1-n includes a transmit channel, a receive channel, and a control circuit such as shown in FIGS. 2 and 3. Assume a talking conferee provides speech energy at microphone M1-1 so that transmit channel T1-1 is active and receive channel R1-1 is inactive. The speech energy at microphone M1-1 is amplified by preamplifier 201, permitted to pass through variolosser 203 under control of circuit C1-1 and is applied to line P4-1 via amplifier 205. Outgoing coupling network N1-1 includes operational amplifier 413, and line P4-1 is coupled to the input of amplifier 413 via impedance I4-1. The output of amplifier 413 is connected to communication network 110 via matching impedance 410, outgoing terminal 101 and outgoing line 120.

Simultaneous with the transmission of signals derived from speech energy at microphone M1-1, an incoming signal from another conference location, e.g., location 160 in FIG. 1, is applied via network 110, incoming line 125, and incoming terminal 105 to operational amplifier 415 in coupling network N1-2. The output of amplifier 415 is distributed to loudspeaking devices L1-2 through L1-n through the active ones of receive channels R1-1 through R1-n, respectively. Since receive channel R1-1 is inactive, the incoming signal from amplifier 415 is not applied to loudspeaking device L1-1.

In normal operation at conversational levels, the speech energy incident on microphone M1-1 is insufficient to switch sets S1-2 through S1-n to their transmit modes and the receive channel in each of these sets is operative. Thus, receive channel R1-2 amplifies the incoming signal from amplifier 415 and provides acoustic output from loudspeaking device L1-2 responsive to the signal transmitted from the other location via communication network 110. Similarly, receive channel R1-2 provides an output to loudspeaking device L1-2 and the acoustic separation of device L1-2 and microphone M1-1 limits the coupling therebetween of signals from other locations so that regenerative feedback does not occur. The acoustic stability is also aided by the differential operation of the control circuits as aforementioned. In this arrangement, the talking conferee at microphone M1-1 is heard at location 150, and a signal corresponding to his speech energy is transmitted to the other locations through communication network 110. Simultaneously, conferees at other locations are heard at location 150 via loudspeaking devices L1-2 through L1-n.

If a second talking conferee at microphone M1-2 applies sufficient speech energy to set S1-2 so that set S1-2 is switched to its transmit mode of operation, transmit channel T1-2 is operative and the output signal therefrom is applied via line P4-2 and impedance I4-2 to the input of amplifier 413. Receive channel R1-2 is inactive at this time, but any incoming signal from network 110 is heard at location 150 from those loudspeaking devices remaining active i.e., L1-3 through L1-n. Thus, as many as n-1 sets may be operating in the transmit mode at the conference connection at location 150, and the conference arrangement, according to the invention, permits transmission to the other locations via network 110 and simultaneously allows signals from other locations to be heard at location 150. It is also to be understood that some set at location 150 may be made operative only in its receive mode. In this manner, all active transmit channels at a location may operate simultaneously and the conferees at that location may still hear conferees from other locations.

In the arrangement of FIG. 4, each speakerphone set is operative responsive to its own switching threshold and the outputs of the active transmit channels are summed in amplifier 413. The transmit channel of one speakerphone set is immediately operative responsive to speech energy from a talking conferee in the vicinity of its microphone but is relatively insensitive to conferees at more remote positions at the location conference room. Therefore, each location may transmit signals to another location while receiving signals therefrom. Further, reverberation and noise pickup is reduced by the independent operation of each set control circuit, but more than one transmit channel may be operative at a time.

Figure 5:
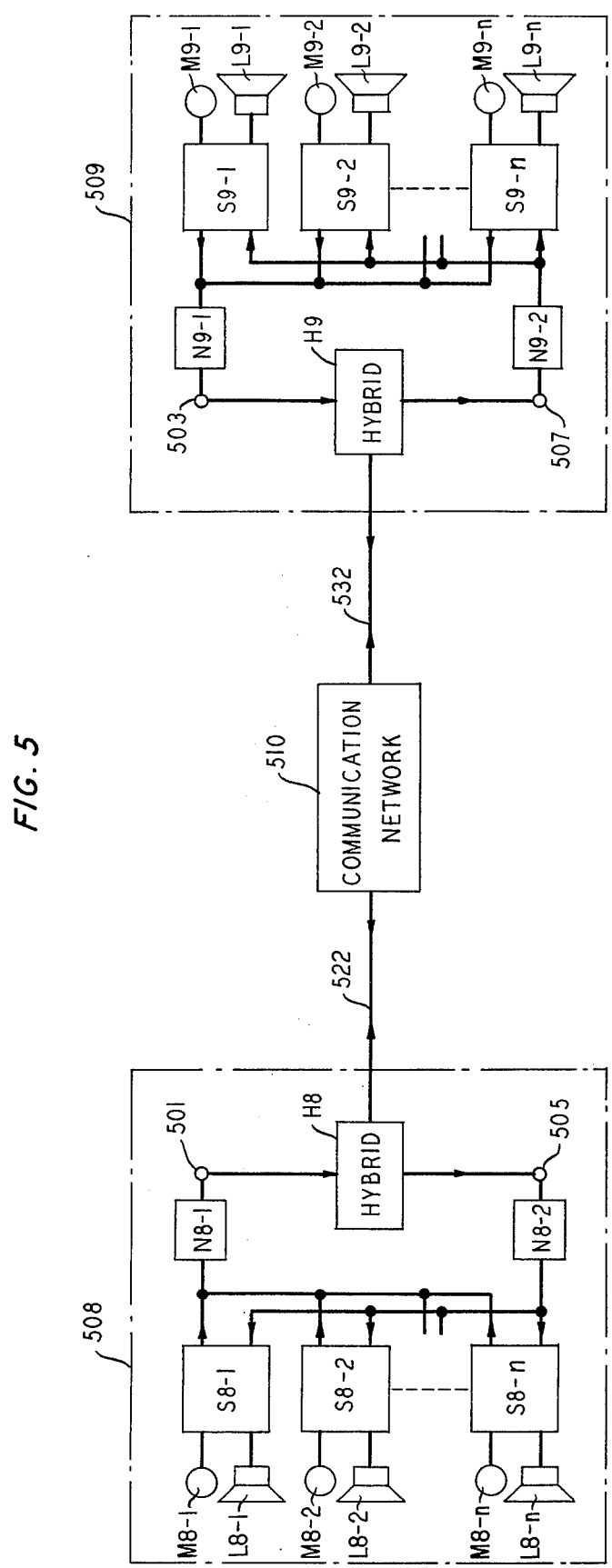
FIG. 5 shows a block diagram of a teleconferencing circuit illustrative of the invention in which hybrid coupling is used.

FIG. 5 shows a teleconferencing circuit illustrative of the invention in which each of remote locations 508 and 509 is connected to communication network 510 via a bidirectional 2-wire line. Location 508 includes a plurality of speakerphone sets such as shown in FIGS. 1 and 2, outgoing coupling network N8-1, and incoming coupling network N8-2. Outgoing terminal 501 receives the combined output signals from the active transmit channels of sets S8-1 through S8-n and applies the combined transmit channel outputs to hybrid H8. Hybrid H8, as is well known in the art, couples an outgoing line to a bidirectional line and the bidirectional line to an incoming line while isolating the incoming line from the outgoing line. In the circuit of FIG. 5, the signals on outgoing terminal 501 are coupled through hybrid H8 to 2-wire line 522, and the incoming signals on incoming line 522 are coupled to incoming terminal 525. Similarly, hybrid H9-n at location 509 couples the combined outputs of active transmit channels of sets S9-1 through S9-n from outgoing terminal 503 to bidirectional line 532. The incoming signals to location 509 on line 532 are coupled through hybrid H9 to incoming terminal 507. Hybrid H9 thereby isolates the outgoing signals on terminal 503 from terminal 506.

FIG. 6 shows a loudspeaking teleconferencing circuit interconnecting locations 604, 605, 606, and 607 via conference bridge 610. Location 604 includes speakerphone sets S4-1 through S4-n, outgoing coupler N4-1, and incoming coupler N4-R. The speakerphone set arrangements at location 604 are substantially similar to those described with reference to FIG. 1. Four-wire line 614 is connected between couplers N4-T and N4-R and conference bridge 610. Similarly, each of locations 605 through 607 includes a plurality of speakerphone sets and couplers which are connected through 4-wire lines 615, 616, 617, respectively, to conference bridge 610. As is well known in the art, conference bridge 610 is operative to optimize the coupling of outgoing and incoming signals among the interconnected locations. The conference bridge provides optimum coupling among remote locations and, in the conferencing arrangement of FIG. 6, may improve the quality of signal transmission among widely separated locations. It is to be understood, however, that any of the well-known communication networks suitable for interconnecting more than two communication terminals may also be used and that interconnections among locations may utilize 2-wire lines where suitable hybrids are inserted, as is shown in FIG. 5.

While the invention has been shown and described with reference to particular embodiments thereof, it is to be understood by those skilled in the art that changes in form and detail may be made thereto without departing from the spirit and scope of the invention.

What is claimed is:

1. A conferencing system for a plurality of remote conference locations comprising a plurality of loudspeaking telephone sets at each conference room location, an incoming terminal and an outgoing terminal at each conference room location, and a communication path between the incoming and outgoing terminals of said locations; each loudspeaking telephone set comprising a microphone, a loudspeaking device, a transmit channel having an input connected to said microphone and an output, a receive channel having an input coupled to said incoming terminal and an output connected to said loudspeaking device, and control means jointly responsive to speech energy on said set transmit channel and speech energy on said set receive channel for selectively activating one of said set transmit and receive channels and concurrently deactivating the other of said set transmit and receive channels, the control means of each loudspeaking telephone set being operative independently of the control means of the other loudspeaking telephone set, and means connected between the output of each transmit channel and said conference room location outgoing terminal for combining the outputs of said active transmit channels and for applying said combined output to said conference room location outgoing terminal, said communication path comprising means for coupling the combined output from the outgoing terminal of one conference room location to only the incoming terminals of the other remote locations.

2. A conferencing system according to claim 1 wherein each set control means comprises means responsive to speech energy on said set transmit channel for generating a first signal, means responsive to speech energy on said set receive channel for generating a second signal, means responsive to said first signal being greater than said second signal for turning on said set transmit channel and turning off said set receive channel, and means responsive to said first signal being less than or equal to said second signal for turning on said set receive channel and turning off said set transmit channel, the control means of each loudspeaking telephone set at a conference room location being operative independently of the other set control means at said conference room location whereby a plurality of active transmit channels are connected to said conference room location outgoing terminal.

3. A conferencing system according to claim 2 wherein said means for combining the outputs of said active transmit channels comprises means for summing said active transmit channel outputs.

4. A conferencing system according to claim 3 further comprising means for acoustically separating each loudspeaking telephone set microphone from the loudspeaking devices of the other loudspeaking telephone sets at said conference room location to prevent electroacoustic feedback through the signal path including at least two conference locations.

5. A conferencing system according to claim 4 wherein each set microphone comprises a unidirectional microphone.

6. A conferencing system according to claim 4 wherein each set microphone comprises an omnidirectional microphone and each set microphone at a location is at least a predetermined distance from the loudspeaking devices of the other sets at said location.

7. A conference system according to claim 1 wherein said communication path comprises a 4-wire line including an outgoing line connected to each conference room location outgoing terminal and an incoming line connected to each conference location incoming terminal, each conference room location outgoing terminal being electrically isolated from said location conference room incoming terminal.

8. A conference system according to claim 1 wherein said communication path comprises a 2-wire line and said location further comprises a hybrid for connecting said conference room location outgoing terminal and said conference room location incoming terminal to said 2-wire line whereby each conference room location outgoing terminal is electrically isolated from said conference room location incoming terminal.

9. A conference system according to claim 1 wherein said communication path comprises a conference bridge and means for connecting said conference bridge to the incoming and outgoing terminals of each conference room location, each conference location outgoing terminal being electrically isolated from said conference room location incoming terminal.

10. A loudspeaking teleconferencing system comprising a communication network, and at least one conference location including a plurality of loudspeaking telephone sets in a conference room, a conference room incoming terminal, a conference room outgoing terminal, and means for connecting said conference room incoming and outgoing terminals to said communication network; each loudspeaking telephone set comprising a microphone, at least one loudspeaking device, a transmit channel having an input connected to said microphone and an output, a receive channel having an input coupled to said incoming terminal and an output coupled to said loudspeaking device, and a control circuit jointly responsive to speech energy on said set transmit channel and speech energy on said set receive channel for selectively holding on one of said transmit and receive channels and for holding off the other of said set transmit and receive channels, each set control circuit being operative independently of the control circuits of the other sets, and means for combining the outputs of said conference room set transmit channels and for applying said combined outputs to said conference room outgoing terminal, said communication network being adapted to transmit said combined outputs from said conference room outgoing terminal to only the incoming terminals of the other locations.

11. A loudspeaking teleconferencing system according to claim 10 wherein said control circuit comprises means responsive to speech energy on said transmit channel for producing a first signal, means responsive to the speech energy on said receive channel for producing a second signal, and means for comparing said first and said second signals, said comparing means being responsive to said first signal being greater than said second signal for holding on said set transmit channel and holding off said set receive channel and responsive to said first signal being less than or equal to said second signal for holding on said said set receive channel and holding off said set transmit channel.

12. A loudspeaking teleconferencing system according to claim 10 wherein the microphone of each loudspeaking telephone set is acoustically separated from the loudspeaking device of the other loudspeaking telephone sets in said conference room to prevent regenerative coupling through the path including said conference room and at least one other location.

13. A loudspeaking telephone system according to claim 12 wherein the microphone of each loudspeaking telephone set at said location is separated a predetermined distance from the loudspeaking devices of the other loudspeaking telephone sets.

14. A loudspeaking telephone system according to claim 12 further comprising a conference table, each set microphone being placed on said conference table at least a predetermined distance from the loudspeaking devices.

15. A loudspeaking telephone system according to claim 12 wherein each microphone comprises an omnidirectional microphone.

16. A speakerphone conferencing system serving first and second remote conference room locations, each location comprising a plurality of speakerphone sets in a room, and an incoming terminal and an outgoing terminal, a communication network for coupling the outgoing terminal of said first conference room location to only the incoming terminal of said second conference room location and for coupling the outgoing terminal of said second conference room location to only the incoming terminal of said first conference room location; each speakerphone set comprising a microphone, a loudspeaking device, a transmit channel having an input connected to said microphone and an output, a receive channel having an input coupled to said incoming terminal and an output coupled to said loudspeaking device, and a control circuit comprising means responsive to speech energy on said transmit channel for generating a first signal, means responsive to speech energy on said receive channel for generating a second signal, means for comparing said first and second signals, said comparing means being responsive to said first signal being greater than said second signal for turning on said transmit channel and turning off said receive channel and responsive to said first signal being equal to or less than said second signal for turning on said receive channel and turning off said transmit channel, each set control circuit being operative independently of the control circuits of the other sets; and means for summing the outputs of said transmit channels and for applying said summed output to said conference room location outgoing terminal.

17. A speakerphone conference system according to claim 16 wherein said communication network comprises a 4-wire line including a first-direction line connected between the outgoing terminal of said first location and the incoming terminal of said second location, and a second one-direction line connected between the outgoing terminal of said second location and the incoming terminal of said first location.

18. A speakerphone conferencing system according to claim 16 wherein said communication network comprises a bidirectional line, and each of said first and second locations further comprises a hybrid for coupling the summed output from said location outgoing terminal to said bidirectional line, and means for coupling the bidirectional line to said incoming terminal, said hybrid being operative to electrically isolate said incoming terminal from said outgoing terminal.

19. A speakerphone conference system according to claim 16 wherein said communication network comprises a switching network, a first 4-wire line connected between said switching network and said first location including an outgoing line connected to said first location outgoing terminal and an incoming line connected to said first location incoming terminal, a second 4-wire line connected between said switching network and said second location including an outgoing line connected to said second location outgoing terminal and an incoming line connected to said second location incoming terminal, said switching network interconnecting said first 4-wire outgoing line with said second 4-wire incoming line and interconnecting said first 4-wire incoming line with said second 4-wire outgoing line.

* * * * *